UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

PROCESS OF MAKING STORAGE-BATTERY ELECTRODES.

No. 914,343.　　　　　Specification of Letters Patent.　　Patented March 2, 1909.

Original application filed March 30, 1905, Serial No. 252,929. Divided and this application filed May 17, 1907. Serial No. 374,306.

*To all whom it may concern:*

Be it known that I, THOMAS A. EDISON, a citizen of the United States, and a resident of Llewellyn Park, Orange, in the county of Essex and State of New Jersey, have invented a certain new and Improved Process for Making Storage-Battery Electrodes, of which the following is a description.

This application is a division of my Patent No. 882,144, granted March 17, 1908.

My invention relates to an improved process for making a storage battery electrode, wherein the active material is associated with minute flakes or foils of an insoluble metal or metals, preferably cobalt or an alloy of nickel and cobalt, or nickel alone. In using metallic conducting flakes for admixture with the active material, difficulties have been experienced, due in the first place, to the fact that electrical contact between the metallic flakes and between the flakes and the pocket walls is generally poor and difficult to maintain, except under considerable pressure, and in the second place, to the fact that opportunity is offered within the mass for the trapping of gas, resulting in separation of the active particles and bulging of the pocket walls, to further increase the difficulties of contact. The latter objection is more pronounced when the battery solution employed is quite concentrated and hence in the best condition for high economy, owing to the viscous character thereof. Consequently, there has heretofore been a limit at which the further concentration of the solution cannot be carried without serious objection.

By my improved process I provide an improved storage battery electrode, wherein metallic contacts within the electrode are entirely done away with, and wherein very much less opportunity is offered for gas pressure due to solution viscosity, and for trapping of gas with the objections noted.

To this end, the invention consists of a process for producing a storage battery electrode, wherein the flakes of conducting metal or metals are welded together and to the pocket walls, if used, presenting a highly diversified cellular integral structure with a very small weight of metal, in which the active material is intimately contained, the process of manufacture being such that the active material is introduced within the cellular structure after the formation of the latter, so that obviously, free passage will be allowed for the escape of any gas generated *in situ*. By so constructing the conducting metal that it shall constitute a honeycomb or sponge-like cellular structure within the pocket or other electrode element and by allowing free opportunity for the escape of gas generated therein, the tendency of the electrode mass, as a whole, to swell is very largely reduced, and for this reason the necessity of employing expensive and highly elastic steel is overcome; moreover the cheaper steel, if used, can be more readily and economically perforated. Furthermore, by employing an integral metallic sponge-like conducting system, as explained, the conductivity of the latter will be always constant and as it presents cells of minute size, the thickness of active material in contact with any part of the conducting system will be relatively slight (probably not greater than one or two particles thick) so that it will be necessary for the current to traverse paths of the minimum length through the active particles, thus allowing an enormously high discharge rate. By impregnating the cells of the conducting structure, as hereinafter described, I am furthermore enabled to remove the active material whenever necessary, after which the conducting structure may be cleaned by hydrogen and re-used with fresh active material. Furthermore, the process of forming the conducting metallic sponge or cellular structure within the pockets, as explained, also results in the welding of the pocket sections so that a structure will be secured wherein all metallic contacts are eliminated, the advantages of which are obvious.

Assuming the mechanical make-up of the electrode to be substantially like that illustrated in my Patent No. 704,305, dated July 8, 1902, I proceed substantially as follows: I first take a suitable refractory material capable of being readily dissolved when desired, such as magnesium oxid, and mix it with a small quantity of water containing a little carbonate of soda or other suitable binder. Only enough water is added to slightly moisten the oxid, so that after thorough mixing the oxid shows a tendency to cake together or pack slightly. This mass is then molded into thin cakes under hydraulic pressure and the cakes are subjected to a white heat, so as to consolidate the same and make them fairly hard. The cakes are then crushed to form granules of fairly definite size which are then screened. Those particles passing a 20 mesh screen and rejected by an 80 mesh screen are first mixed with water, then dried, and are then mixed with a suitable sticky material, preferably stiff molasses, until the exterior surface of all the particles is coated with the latter. I now add the thin metallic flake-like conducting metal or metals (preferably cobalt or a cobalt-nickel alloy, or nickel alone) in the form of relatively small films or scales in substantially the proportion of twenty-four parts by weight of the granular oxid and five parts by weight of the conducting metal, and intimately mix the same. Owing to the presence of the thin sticky film on each of the oxid granules, the surface thereof will be coated with the flake-like metal, so that when the mixing is complete the resulting mass shows to the eye none of the white oxid, but appears to consist entirely of metallic granules.

The metallic flakes referred to may be made in any suitable way; for example, thin sheets of cobalt or nickel, or a nickel-cobalt alloy made by fusion, may be rolled into flakes, oil being used to prevent sticking, as is well known, for instance, in the art of making bronze powder. Or instead, the hydroxid of either metal, or the mixed hydroxids of both metals in the proper proportion can be precipitated in the usual way, washed, dried and granulated to the proper size, and after reduction by hydrogen or otherwise, passed between rolls with oil to form the flakes, as I describe in my Patent No. 827,717, granted August 7th, 1906. In either case, it is desirable to anneal the flakes two or more times between the passes of the rolling operation in an inert gas, preferably hydrogen, at a red heat. After the flakes are formed, it is preferable, in order to increase their bulk, to pass them between very fine crimping rolls by which they will be crimped, corrugated or otherwise distorted, or between rolls of very small diameter by which they will be curled or formed into minute curved flakes. Or instead, the flakes or foils may be made by a process of electrodeposition as I describe in my Patent No. 821,626, granted May 29th, 1906, in which event the subsequent crimping or curling operation may be dispensed with, since electrodeposited films naturally assume curved or coiled forms. For construction of the flakes or scales, or foils, I find that metallic nickel, although perfectly insoluble, possesses the objection that good contact with the active material cannot be secured unless an undesirably high pressure is employed. This fact can be possibly attributed to the formation of an invisible film of non-conducting oxid by the action of electrolysis on the nickel flakes. Metallic cobalt on the other hand, is not open to this objection, for although its surface is slightly attacked by electrolysis, yet good contact with the active particles is secured, even when no pressure is used other than the weight of the particles themselves. It is possible, however, that the electrolytic action on the metallic flakes, if made wholly of cobalt, might, in a long time gradually disintegrate the same, and for this reason I consider it undesirable to rely on metallic cobalt alone. I therefore prefer to make use of a nickel-cobalt alloy, containing say—60 per cent. of cobalt and 40 per cent. of nickel. With such an alloy good contact with the active material will be secured by the mere weight of the latter without additional pressure, while at the same time, oxidation of the cobalt will not penetrate into the alloy to a harmful extent, so that the flakes will preserve their metallic identity. This desirable characteristic of the nickel-cobalt alloy is present even when the proportions of the two metals are widely varied.

The mixture secured by adding the flakes to the coated particles is dried, and is preferably introduced within the usual sectional pockets which are assembled in the grid, and hydraulic pressure applied, as I describe in my said patent, to engage the pocket sections together and lock the latter firmly in the grid. The grid is now immersed in slightly alkaline water (say—a two per cent. solution of potassium hydroxid) until the molasses has entirely percolated out of the mass, which can be effected by several changes of the solution, after which the electrode is again subjected to pressure. The electrode is now dried, and is placed in a retort through which hydrogen is passed, and brought to a bright yellow heat. The presence of the hydrogen atmosphere prevents any oxidation of the metal at the heat used, and the two sections of each pocket will be thus welded to one another, and the metallic flakes or foils distributed throughout the mass will be also welded together and to the pocket sections. In other words, by this welding operation, integrality of the entire metallic parts of the electrodes is secured, so as to entirely eliminate metallic contacts in the electrode system. Furthermore, by welding together the metallic flakes within the pockets, free opportunity for the escape of gas is allowed, reducing the danger of gas pressure arising in the active mass, and permitting a much cheaper grade of steel to be employed. It will of course, be understood that the heat applied is sufficient only to effect a welding operation and not sufficient to result in melting the metal enough to cause it to flow. After the welding operation thus described has been effected, it becomes necessary to remove the granular magnesium oxid, since the function of the latter as a support for sustaining the metallic films prior to and during the welding operation has now been fulfilled. This removal can be secured by dissolving out the oxid in any suitable way, as for example, in dilute acetic acid, which does not sensibly attack the metallic parts. As a result of the operations so far followed, I obtain a structure in which the usual perforated pockets are loosely filled with a fine, quite soft, pithy, readily compressible, sponge-like or honeycomb mass of insoluble metal or alloy, presenting innumerable cells all connected together, and, in bulk occupying only a fraction of the available space inclosed by each pocket and of such a character as to make good contact with the active material. After the acid has been washed out and the electrode dried, the electrode plate is preferably subjected in a hydrogen atmosphere to heat, insufficient to effect a further welding, but sufficient to effectively clean all the metallic surfaces and reduce any oxid present, so as to permit perfect contact with the active material (for example, nickel hydroxid) which it now becomes necessary to introduce within the cellular mass. This is done by introducing the electrodes in a closed chamber connected to a vacuum pump, and whose walls may be heated, for instance, by a steam jacket. I now introduce within the inclosed chamber by means of a pump, a saturated solution of a suitable nickel salt, preferably an ammoniacal solution of nickel hydroxid, made by dissolving to saturation, nickel sesquioxid in ammonia. This saturated ammoniacal solution enters at the bottom of the chamber and as the level rises all the pores or cells of the sponge-like structure will be filled with the same. The surplus solution is now withdrawn from the impregnating chamber, capillarity preventing the escape of the solution from the sponge-like structure, the vacuum pump is operated, and heat is applied to quickly evaporate the ammonia and water, leaving a deposit of nickelous hydroxid on the walls of the many cells, the ammonia being absorbed in water or otherwise recovered. By repeating these operations many times, the cells may be almost entirely filled with the active hydroxid, care being of course taken to use at all times a saturated solution, in order that the active material deposited within the cells shall not be dissolved out during the succeeding operations. By depositing the active material in successive layers on the walls of the cells, as explained, it is possible to so regulate the amount of active material thus introduced, as to provide numerous minute connected channels, extending in all directions, throughout the mass and leading to the surface thereof, and through which any gas generated within the mass may freely escape. The electrodes thus formed are now removed, the exterior surfaces freed from any oxid which may adhere to the same, and after being subjected to pressure to consolidate the metallic sponge on the active material, are ready for use.

It will be understood that the requisite cellular structure can be secured in other ways than by the process above indicated. For instance, any other suitable inert refractory granular material capable of being dissolved or otherwise removed may be employed, instead of a magnesium oxid, such as ignited tricalcic phosphate, in granular form. With this material the operations are the same as those followed with magnesium oxid. It is also possible to omit the granular material, and introduce the corrugated or curved flakes or foils loosely into the pockets by jarring and tamping, followed by welding in hydrogen, and impregnation with active material, as described in my Patent No. 854,200 granted May 21, 1907.

Improved results will be secured when the pocket sections and grid of each electrode are plated with cobalt-nickel alloy, instead of with nickel alone, as heretofore, since such an alloy materially increases the character of contact. Such an alloy may be formed of 50 per cent. cobalt and 50 per cent. nickel, and may be applied by electro-deposition in any suitable way. After this cobalt-nickel plating has been applied, the metal parts are preferably welded by the application of heat in an inert gas, such as hydrogen, so as to relieve any condition of tension in the deposited coating.

While I prefer to employ scales or flakes of a suitable metal or alloy for forming the sponge-like conducting structure surrounding the active mass, as I thereby obtain the greatest porosity with the least weight of metal, the same process may be carried out with the metal or alloy in powdered form, although at a sacrifice of weight, since obviously the relation between the bulk of the metal or alloy and the cubical contents of the cells or pores, would be much less in the case of the metallic powder than in the case of metallic scales, flakes or foils, so that the use of metallic powder would probably be commercially inapplicable. Finally, it will be understood that the sponge-like conducting structure may be used for supporting the active material independently of the usual perforated pockets in which case the latter may be omitted. I consider it preferable, however, to use the perforated metallic pockets as they materially strengthen the construction of the electrode, and effectively prevent the active material from scaling off or falling out of the exposed cells or pores at the surface of the spongy mass. Furthermore, the perforated pockets protect the spongy mass effectively against accident, since the mass is somewhat fragile and of but slight tenacity.

I do not claim herein the specific method described of forming the spongy or honeycomb structure by the loose introduction of the flake-like or foliated material into the pocket or receptacle, since this specific process is described and claimed in my Patent No. 854,200, granted May 21, 1907. There are, however, claims in my present application, the language of which is generic enough to include the specific process described in my said co-pending case. Neither do I claim herein any specific process for making flakes or foils, since such processes are specifically described and claimed in my Patent No. 821,626 granted May 29, 1906, referring to the method of making said flakes by electro-deposition, in my Patent No. 827,717 granted August 7, 1906, referring to the making of said flakes by precipitation, and in my Patent No. 821,627 granted May 29, 1906, referring to the making of said flakes by sublimation.

Having now described my invention, what I claim as new therein and desire to secure by Letters Patent is as follows:

1. The process of making electrodes for storage batteries, which consists in associating a mass of conducting metallic particles in a cellular or honeycomb arrangement, and in subjecting the same to a welding temperature to secure integrality of said particles, substantially as set forth.

2. The process of making electrodes for storage batteries, which consists in associating a mass of conducting metallic scales or films in a cellular or honeycomb arrangement and in subjecting the same to a welding temperature to secure integrality of the films or scales, substantially as set forth.

3. The process of making electrodes for storage batteries, which consists in associating a mass of conducting metallic scales or films in a cellular or honeycomb arrangement, and in subjecting the same to a welding temperature in hydrogen gas to secure integrality of the films or scales, substantially as set forth.

4. The process of making electrodes for storage batteries, which consists in coating granular material with conducting metallic films or scales, in compressing the mass to secure coherence thereof, and in subjecting the scales or films to a welding temperature, substantially as set forth.

5. The process of making electrodes for storage batteries, which consists in coating granular material with conducting metallic scales or films, in compressing the mass to secure coherence thereof, and in subjecting the scales or films to a welding temperature in a hydrogen atmosphere, substantially as set forth.

6. The process of making electrodes for storage batteries, which consists in coating refractory particles with flake-like conducting metallic scales, in subjecting the mass to pressure, and in then heating the mass to a welding temperature, whereby the metallic scales will be welded together, and in finally removing the refractory particles to produce a sponge-like cellular conducting structure, substantially as set forth.

7. The process of making electrodes for storage batteries, which consists in coating refractory particles with flake-like conducting metallic scales, in subjecting the mass to pressure, in then heating the mass to a welding temperature whereby the metallic scales will be welded together, in removing the refractory particles to produce a sponge-like conducting structure, and finally in subjecting the same to heat in a hydrogen atmosphere, as and for the purposes set forth.

8. The process of making electrodes for storage batteries, which consists in applying a sticky material to refractory particles, mixing therewith flake-like metallic scales, whereby the particles will be covered by said scales, in subjecting the mass to pressure, in then subjecting the mass to a welding temperature whereby the metallic scales will be welded together, and in finally removing the refractory particles to leave a sponge-like cellular structure, as and for the purposes set forth.

9. The process of making electrodes for storage batteries, which consists in coating particles of magnesium oxid with flake-like metallic scales, in subjecting the mass to pressure, in then subjecting the compressed mass to a welding temperature to weld the metallic scales together, and in finally dissolving the oxid particles, substantially as set forth.

10. The process of making electrodes for storage batteries, which consists in coating particles of magnesium oxid with a sticky material, in mixing flake-like conducting scales therewith to coat the particles, in subjecting the mass to pressure, in then subjecting the compressed mass to a welding temperature to weld the metallic scales together, and in finally removing the oxid particles, substantially as set forth.

11. The process of filling a conducting sponge-like or cellular structure with an active material, in the make-up of storage battery electrodes, which consists in introducing a saturated solution of the active material within the cells, and in finally applying heat to drive off the solvent and deposit and precipitate the active material on the walls of the cells, substantially as set forth.

12. The process of filling a conducting sponge-like or cellular structure with an active material, in the make-up of storage battery electrodes, which consists in introducing a saturated solution of nickel hydroxid within the cells, and in finally applying heat to drive off the solvent and precipitate the nickel salt on the walls of the cells, substantially as set forth.

13. The process of filling a conducting sponge-like or cellular structure with an active material, in the make-up of storage battery electrodes, which consists in introducing a saturated solution of nickel hydroxid within the cells, and in finally applying heat in a rarefied atmosphere to drive off the solvent and precipitate the nickel salt on the walls of the cells, substantially as set forth.

14. The process of filling a conducting sponge-like or cellular structure with an active material in the make-up of storage battery electrodes, which consists in introducing therein a saturated ammoniacal solution of nickel hydroxid, finally in applying heat to drive off the ammonia and water to precipitate the nickel salt on the walls of the cells, substantially as set forth.

15. The process of filling a conducting sponge-like or cellular structure with an active material, in the make-up of storage battery electrodes, which consists in introducing therein a saturated ammoniacal solution of nickel hydroxid, finally in applying heat in a rarefied atmosphere to drive off the ammonia and water to precipitate the nickel salt on the walls of the cells, substantially as set forth.

16. The process of making storage battery electrodes, which consists in introducing a sectional pocket within a suitable grid, and in subjecting the same to a welding temperature, as and for the purposes set forth.

17. The process of making storage battery electrodes, which consists in introducing a sectional pocket within a suitable grid, and in subjecting the same to a welding temperature, in a hydrogen atmosphere, substantially as set forth.

18. The process of making storage battery electrodes, which consists in introducing a sectional perforated metallic pocket within a suitable grid and subjecting the same to a welding temperature, substantially as set forth.

19. The process of making storage battery electrodes which consists in introducing conducting particles within a pocket, introducing said pocket within a suitable grid, and in subjecting the same to a welding temperature, substantially as set forth.

20. The process of making storage battery electrodes which consists in associating nickel hydroxid with conducting metallic particles in an inclosing pocket, and securing said pocket within a suitable grid, substantially as set forth.

21. The process of making storage battery electrodes, which consists in associating active material with conducting metallic particles in an inclosing pocket, and securing said pocket within a suitable grid, substantially as set forth.

22. The process of making storage battery electrodes, which consists in introducing a mass of conducting metallic particles within an inclosing pocket and subjecting the same to a welding temperature, and associating active material therewith, substantially as set forth.

This specification signed and witnessed this 15th day of May, 1907.

THOMAS A. EDISON.

Witnesses:
FRANK L. DYER,
FRANK D. LEWIS.